(12) United States Patent
Faisal Padinjareveetil et al.

(10) Patent No.: US 11,411,845 B1
(45) Date of Patent: Aug. 9, 2022

(54) REAL-TIME NETWORK MONITORING

(71) Applicant: Amazon Technologies, Inc., Seattle, WA (US)

(72) Inventors: Abdul Salam Faisal Padinjareveetil, San Jose, CA (US); Amogh Dhananjay Dhamdhere, San Diego, CA (US); Aditya Srinivasan, Seattle, WA (US); Harvo Reyzell Jones, Gig Harbor, WA (US); Snehal Mahadik, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/491,238

(22) Filed: Sep. 30, 2021

(51) Int. Cl.
*H04L 43/062* (2022.01)
*H04L 43/0811* (2022.01)
*H04L 43/045* (2022.01)
*H04L 43/0888* (2022.01)
*H04L 43/0882* (2022.01)

(52) U.S. Cl.
CPC .......... *H04L 43/062* (2013.01); *H04L 43/045* (2013.01); *H04L 43/0811* (2013.01); *H04L 43/0882* (2013.01); *H04L 43/0888* (2013.01)

(58) Field of Classification Search
CPC . H04L 43/062; H04L 43/045; H04L 43/0811; H04L 43/0882; H04L 43/0888
See application file for complete search history.

(56) References Cited

U.S. PATENT DOCUMENTS

| | | | |
|---|---|---|---|
| 9,952,891 B2* | 4/2018 | Zada | G06F 9/5061 |
| 10,365,934 B1* | 7/2019 | Madan | G06F 9/455 |
| 10,409,662 B1* | 9/2019 | Young | G06F 11/0793 |
| 2003/0065763 A1* | 4/2003 | Swildens | H04L 12/14 |
| | | | 709/224 |
| 2017/0103014 A1* | 4/2017 | Segler | G06F 11/3442 |
| 2017/0277553 A1* | 9/2017 | Zada | G06F 9/45558 |
| 2018/0091392 A1* | 3/2018 | Richards | H04L 43/08 |
| 2018/0091401 A1* | 3/2018 | Richards | H04L 43/0817 |
| 2019/0196861 A1* | 6/2019 | Neogy | G06F 11/301 |
| 2020/0304523 A1* | 9/2020 | Yadav | H04L 43/0894 |
| 2021/0119890 A1* | 4/2021 | Richards | H04L 43/08 |
| 2021/0194785 A1* | 6/2021 | Raghuramu | H04L 61/6022 |
| 2021/0224121 A1* | 7/2021 | Ganti | G06F 9/45558 |

* cited by examiner

*Primary Examiner* — Jerry B Dennison
(74) *Attorney, Agent, or Firm* — Klarquist Sparkman, LLP

(57) ABSTRACT

In a network environment, network health is monitored by a monitoring platform and related monitoring services. A method may include receiving metrics data from a plurality of data sources, overlaying a traffic profile for a client of the network with the metrics data to determine an experience score for the client, and detecting an impairment in the network based on the metrics data and/or the experience score. The method may further include performing a triangulation process to determine a cause of the impairment in the network based on the metrics data, and generating, for display via a user interface, a report indicating the impairment and the cause of the impairment.

20 Claims, 8 Drawing Sheets

REAL-TIME NETWORK MONITORING

BACKGROUND

Network-based services may rely on Internet connectivity to reach clients and/or to allow clients to utilize the services. Accordingly, outages or degradations in operational quality of a wide array of devices, networks, links, etc. may affect a client's ability to reach network-based services. Network conditions may be analyzed by third party tools, however, such tools often operate individually and do not provide insight into the cause or extent of outages that affect the client's ability to reach the network-based services. Furthermore, many of these tools are not applied until a client observes impacts to their own applications and notifies a network operations management entity, at which point the client has already experienced decreased or interrupted performance on the network.

DETAILED DESCRIPTION

Approaches to monitoring network health often lack transparency and depth from the perspective of clients and users of a network. For example, a client may be generally informed of an outage in the network long after the outage has occurred, or the client may even experience the effects of such an outage (e.g., access issues, increased delays, lost data, etc.) before being informed. It is to be understood that, as used herein, a client may refer to a customer (e.g., where the customer may or may not have a financial relationship with the network operator in some examples) or other user of the network that provides services for end users. In either case, the client typically receives little information regarding the cause of the outage or detected issues. Furthermore, the lack of readily available network information may cause the client to inaccurately attribute a non-network issue (e.g., an issue with an application, end user, and/or an intervening/intermediate network) to the network. In this way, the client may be left without information usable to assist the client in correcting or otherwise mitigating (e.g., compensating for) the true underlying issue.

The disclosed technologies provide monitoring services that combine and process network and internet metrics from multiple sources in an intelligent manner to detect, pinpoint, and report anomalous events (e.g., to parties of interest, such as clients, operators, etc.) in real-time. For example, the disclosed technologies include a monitoring platform for a network, which works with a client-targeted health monitoring service to provide information such as availability, latency, throughput, and indications of health events to parties of interest. The disclosed technologies may be configured to, among other features, emit a reachability and performance signal to Internet destinations as granular as an IPv4 /24 and IPv6 /48 using measurements aggregated across multiple sources (e.g., active/passive synthetic measurements and service logs), provide an Internet impairment triangulation signal that is actionable by network operators, provide a high-level client-related score and dashboard view of Internet health for a targeted region, and provide real-time data of Internet reachability and performance for automated traffic engineering systems to consume and perform responsive actions.

Figure 1:
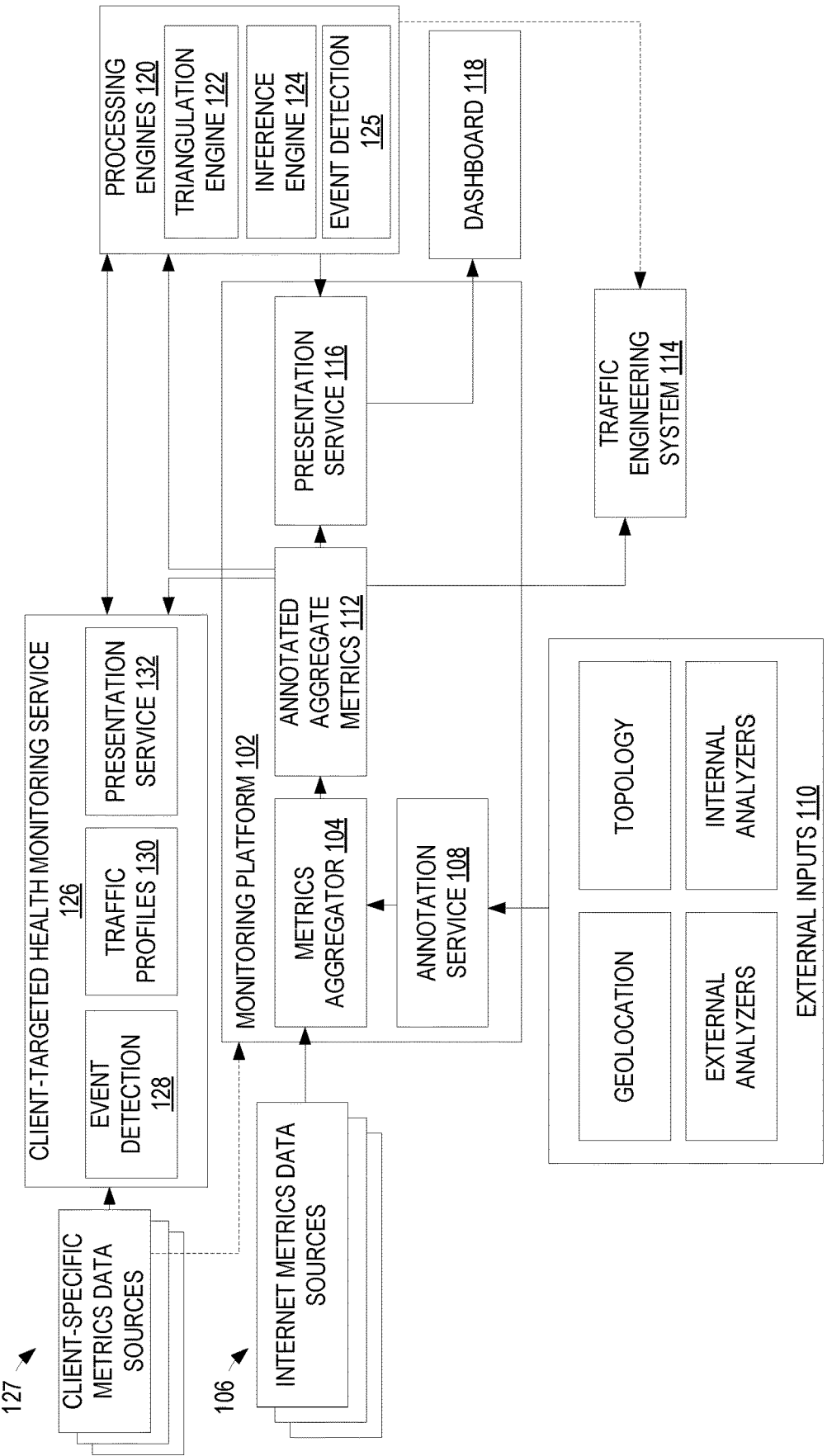
FIG. 1 is a block diagram of an example architecture for monitoring and reporting network health.

FIG. 1 shows an example architectural view of a system 100 for monitoring and reporting network conditions. For example, the components shown in FIG. 1 may be implemented via one or more computing systems comprising memory and processor(s) configured to execute instructions stored in the memory to perform the described operations, as described in more detail below with respect to FIG. 8. In some examples, one or more of the components are implemented using a cloud-based and/or distributed computing system, as described in more detail below with respect to FIG. 7. The system includes a monitoring platform 102, which ingests multiple types of datasets to detect impairment and provide triangulation capabilities to inform operators and software systems that are capable of reacting to these events. The monitoring platform 102 includes a metrics aggregator 104, which receives the above-described metrics data from a plurality of data sources 106. The plurality of data sources 106 may include probe- and/or agent-based data (e.g., data received/derived from probes sent along paths of the network in a controlled manner) and/or measurements observed from active use of the network (e.g., based on on-going traffic through the network), which may be received via in-network systems, third-party services/systems, etc.

The platform 102 also includes an annotation service 108, configured to annotate the received metrics with parameter information based on external inputs 110. The external inputs 110 may provide geolocation information, topology information, information from internal and/or external analyzers, and/or other sources to enrich the metrics data. For example, the information from the external inputs 110 may be used to tag the metrics data with parameters such as a location associated with the metrics (e.g., a location of network entities relating to measurements indicated in the metrics data), an indication of network pathing (e.g., directionality and/or network entities through which data corresponding to the measurements flows), and/or other parameters relating to the metrics/measurements. The external inputs 110 may include inputs from third-party services, internal services, and/or other services.

For example, the annotation service module may be responsible for providing one or more of the following: 1) Network related egress/ingress information based upon an external IP address and the service location. The annotation service may use analysis tools and BGP neighbors data in order to map out how traffic (down to the /24 or /48, for example) maps to physical routers and interfaces for both ingress and egress. 2) Internal paths between regions and Points of Presence (POPs) towards the Internet edge in order to capture ingress/egress path discards along the path. 3) Interface discard information, which is a signal usable when comparing to service metrics that rely upon traffic traversing the same infrastructure. 4) "Service classification," which gives some context (e.g., a name, type of service, port, protocol, etc.) around an IP address to determine to which service it is related. While active and passive systems may provide the service name itself, any absence of this information may be addressed by service classification to populate the applicable service name. 5) Geolocation of the Internet IP address. The annotation service may publish a snapshot dataset, including some or all of the foregoing information, for each applicable service associated with the network for a specific period of time.

The annotated aggregate metrics may be stored in an aggregated metrics data store 112 (e.g., database and/or other storage device). The annotated aggregated metrics from store 112 may be queried by and/or actively propagated to other components of the system 100 for processing. For example, the annotated aggregated metrics from data store 112 may be provided to a traffic engineering system 114 and used to control traffic in the network. As a non-limiting, illustrative example, the traffic engineering system 114 may make traffic shifting decisions based on the aggregated metrics, such as steering traffic away from regions/components of the network that are experiencing issues (e.g., metrics that are below a corresponding threshold related to expected performance of the regions/components).

The annotated aggregated metrics from data store 112 may additionally or alternatively be supplied to a presentation service 116 for generating and outputting a report corresponding to the metrics to a dashboard 118 (e.g., a user interface, viewable by a network operator, client, etc.). In this way, a real-time reporting of the aggregated metrics data may be made available to users. For example, the dashboard may be presented via a website that provides a high-level view to customers/clients to allow them to see impairment signals at a global, regional, and/or POP view. The dashboard may provide a view towards Internet destinations (in terms of autonomous system numbers [ASNs]) through adjacencies with additional information outlining the amount of traffic associated with the region, POP, and/or globally. The dashboard may also include information such as the significance of an ASN, for example, if the ASN handled a large portion of traffic of a country.

In additional or alternative examples, the annotated aggregated metrics from data store 112 may be supplied to one or more processing engines 120. The processing engines may consume reachability and performance measurements from the metrics to determine whether there is any impairment to reachability and performance, and to triangulate that impairment to the set of entities (e.g., ingress/egress interfaces, external ASNs, routers, or links) responsible for the impairment. For example, the processing engines 120 may include a triangulation engine 122 and an inference engine 124, each of which may be configured to determine or estimate network health information based on the annotated aggregated metrics data, as well as an event detection service 125, which may be configured to generate a corresponding alarm/alert/indication based on detected events relating to the aggregated metrics data 112 and/or the triangulation engine 122 and inference engine 124. The inference engine 124 may perform impairment inference operations, including an impairment detection algorithm. The inputs to the detection algorithm may include a time series of reachability and performance metrics from the aggregation layer (the annotated aggregate metrics in data store 112). The impairment detection algorithm may process the input data to determine if there is a reachability or performance impairment (e.g., determining if the input data is outside of a predicted range or band), providing outputs such as an assertion of impaired/not impaired (e.g., a Boolean result), the magnitude of impairment (if impaired), a confidence score indicating a confidence in the assertion based on the data source and model, and/or other outputs.

In some examples, detected impairments may be aggregated for additional processing. For example, the signal from each measurement method and for each pair endpoints (Service_location, Customer /24 or /48) may be analyzed individually to determine impairment, and then this fine-grained impairment signal may be fed to an "impairment aggregation" process, which quantifies overall impact. Such an aggregation enables the system to tease apart impairments at different "levels." For example, if an inbound-HTTP method reveals an impairment but inbound-ICMP and outbound-ICMP do not, then the system can infer that the network path is not impaired but there is an issue higher up the stack (like a DNS issue), Furthermore, producing impairment signals at the finest granularity offers flexibility for the impairment aggregation to produce a client score (described in more detail below with respect to the client-targeted health monitoring service) using additional inputs such as service weights, traffic weights, and geolocation. The output of impairment aggregation may be the client score for reachability and performance at a region-level.

The triangulation engine 122 may determine the most likely location of a reachability failure or performance impairment. Other approaches to deal with reachability issues include assuming that the directly connected network is responsible, and shift away from it; in other words, all end-to-end impairments are assumed to be due to the immediate next hop provider. Such an approach is unnecessary at times, and results in shifting away traffic without knowing whether that shift would help, or how it can adversely affect the performance of traffic that was not impacted in the first place. Such an approach also raises safety concerns such as whether there is adequate capacity elsewhere to handle that traffic without causing congestion and further impact. Triangulating reachability and performance impairments would allow the network system as a whole to take better informed remediation decisions.

Triangulation may be performed on the aggregated impairment signal, described above. As triangulation can be an expensive process, requiring computation, additional measurements, and other resources, it may be undesirable in some examples to perform such an operation on every fine-grained impairment that is detected, since those individual impairments may never rise to the level of alarming or remediation. There are several types of triangulated events that the triangulation engine 122 may generate, which may be actionable for teams like networking. Each one of these faults may also incorporate listing alternative, functioning paths (e.g., using all-paths monitoring from a monitoring system, if possible) presented as alternative solutions if they are not impaired as well. These alarms may also denote if IPv4 or IPv6 (or both) was impacted to provide guidance if a specific protocol should be filtered or not.

Examples of faults that are detected by the processing engines 120 may include a single L3 adjacency fault, which outlines a specific router and external L3 adjacency (Border Gateway Protocol [BGP] session) where the system has triangulated impairment. Traffic control systems may traffic shift away from this particular adjacency by filtering prefixes in both directions. Another example fault is a multiple L3 adjacencies fault, which outlines one or multiple routers and specific L3 adjacencies at which the system has triangulated impairment. An example use case includes multiple links to a Peer ASN in a particular geographical area, but it could apply to other Peer ASNs as well. The traffic control system may prefix-filter away the applicable sessions. Other example faults include upstream faults, such as an upstream autonomous system (AS) adjacency fault and an upstream prefix impairment fault. The upstream AS adjacency fault may outline a specific AS adjacency upstream that is displaying some impairment. This may target the first hop ASN or other ASNs in the path which appear to be impaired (for a significant number of prefixes associated with it). An example reaction from a traffic control system may include de-preferring a specific AS-Path pattern. The upstream prefix impairment fault may outline a specific prefix or set of prefixes for which the system has discovered impairment. These may be mapped to specific BGP prefix announcements, or in additional or alternative examples may be listed as individual /24s (or /48s). An example reaction from a traffic control system may include de-preferring these prefixes, or steering these prefixes onto an alternate working path.

As shown in FIG. 1, the processing engines 120 may provide an output of the determinations described above to the presentation service 116 for output to the dashboard 118, and optionally to the traffic engineering system 114 to control traffic adjustments on the system responsive to results of the determinations (examples of which are described above). Additionally, the processing engines and/or the annotated aggregate metrics in data store 112 may be queried by and/or actively output to a client-targeted health monitoring service 126. The client-targeted health monitoring service 126 may be configured to measure performance (e.g., availability [e.g., number of successful transactions divided by number of attempts], latency [e.g., time for a request to reach a service and time for a response to reach the requester], throughput, etc.), detect impairments, and/or pinpoint root causes of issues with a network, among other operations. The health monitoring service 126 may provide service owners with a framework for quantifying the value of new data sources, provide customers/clients with an interface to view current and historical health between their Internet end-users and the network, enable customers/clients to inspect traffic levels and health results at various levels of granularity, for example city or country, and enable customers/clients to set up automated actions in response to health events (e.g., detected impairments/issues).

In order to provide the above-described functionality, the client-targeted health monitoring service 126 includes an event detection service 128, a data store of traffic profiles 130 (e.g., stored locally or in a communicatively connected storage device), and a presentation service 132. In an example operation of the health monitoring service 126, the event detection service 128 may receive client-specific data from client-specific metrics data sources 127 and/or the annotated aggregate metrics from data store 112 to detect and generate alerts/alarms relating to events for one or more targeted clients (e.g., on a per-client basis). For example, the client-specific metrics data sources provide observed metrics based on Internet activity of a particular client, and may include software (e.g., extensions, add-ons, and/or other code embedded in internet-related applications, including web browsers) executing on client devices. As the aggregated metrics from data store 112 are network-wide, the aggregated metrics may be overlaid with the traffic profiles 130 in order to determine which metrics apply to a targeted client. For example, the traffic profiles 130 for a targeted client may identify areas of the network over which traffic for the targeted client flows, and the aggregated metrics may be filtered and/or weighted using these profiles. In some examples, metrics relating to communication paths/devices through which traffic for the targeted client does not flow may be filtered out and/or weighted lower relative to metrics relating to communication paths/devices through which traffic for the targeted client flows, and metrics relating to communication paths/devices through which traffic for the targeted client flows may be weighted based on an amount of traffic flowing through those paths/devices. Using the client-specific metrics data and/or the aggregated metrics data overlaid with the traffic profiles, the event detection service 128 identifies anomalies, such as metrics that fall outside of expected/predicted ranges of values.

The health monitoring service 126 may query the processing engines (e.g., the triangulation engine 122, inference engine 124, and/or event detection service 125) to map network anomalies to customers/clients experiencing the anomalies (e.g., based on the traffic profiles 130) and identify a cause of the anomalies. For example, the anomalies may be detected by analyzing traffic reports (derived from the aggregated metrics) from different geographies, and determining where operations are performing outside of an expected/predicted range (e.g., availability, latency, and/or throughput is above or below a corresponding threshold range).

The determination of the anomaly in correspondence with a customer/client may be based on how much traffic the customer/client is delivering/receiving to/from an associated geographic region experiencing the anomaly. In this way, the determination of an anomaly as being associated with a selected customer/client may be based on weighted metrics (weighted based on the traffic of the selected customer/client). A report of the determinations/mapping described above may be provided to the customer/client via the presentation service 132 (e.g., using a dashboard, in a similar manner to the dashboard 118 described above). For example, the report may include an indication of a percentage of traffic that is affected by the anomaly based on the traffic profiles 130. In additional or alternative examples, the event detection service 128 may generate and compare the overall network's reported/measured Internet health and customer/client traffic with selected end users' Internet health (determined based on synthetic probes) and application health (determined based on active monitoring for actual traffic) to indicate whether a determined anomaly is associated with the overall network or specific to an application or intervening network. For example, if the overall network's reported/measured Internet health is significantly higher (e.g., operating within predicted availability, throughput, latency, etc. bands) than the end users' Internet health (e.g., operating outside predicted availability, throughput, latency, etc. bands), the anomaly may be determined to be associated with the end user or an end user application rather than a network entity.

Figure 2:
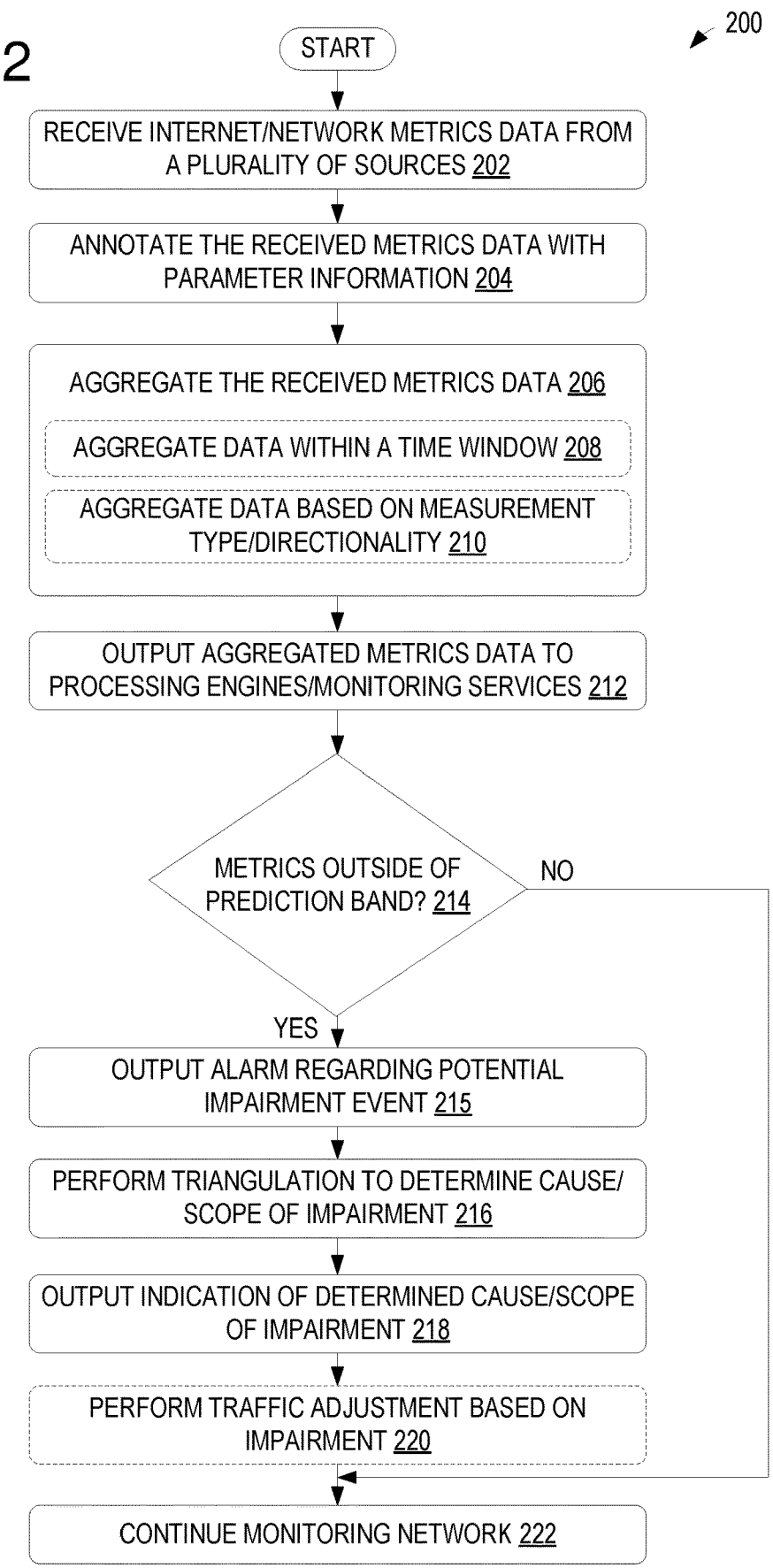
FIG. 2 is a flow chart of an example method for monitoring and reporting network health.

FIG. 2 is a flow chart for an example method 200 for performing real-time network monitoring and anomaly detection/triangulation. The method 200 is performed by a monitoring platform in association with related components, such as the monitoring platform 102 and/or client-targeted health monitoring service 126 of FIG. 1. At 202, the method includes receiving Internet and/or network metrics data from a plurality of sources. For example, the metrics data may be received from synthetic probes and/or based on measurements reported by actual traffic in the network.

At 204, the method includes annotating the received metrics data with parameter information. For example, as described above with respect to annotation service 108, the metrics data may be annotated with location information, topology information (e.g., paths and network devices in the path of traffic associated with the metrics), information from network analyzers, and/or other information.

At 206, the method includes aggregating the received metrics data. As indicated at 208 the data may be aggregated within a time window. As indicated at 210, the data may additionally or alternatively be aggregated based on measurement type and/or directionality. For example, all metrics data within a predetermined or selected time window (e.g., 5 minutes) may be grouped together and processed to determine representative measurements for each type of metric for which metrics data was received during that window. As an illustrative example, for the selected time window, all latency data may be combined (e.g., averaged and/or otherwise statistically combined), all availability data may be combined, all throughput data may be combined, etc. to generate one representative measurement (or a reduced number of representative measurements). In some examples, inbound and outbound data may be combined, whereas in other examples, representative measurements may be determined for inbound and outbound data respectively.

At 212, the method includes outputting the aggregated metrics data to one or more processing engines and/or monitoring services (e.g., the processing engines 120 and/or the client-targeted health monitoring service 126 of FIG. 1). The engines and/or services may process the aggregated metrics and compare the metrics to respective associated prediction bands representing expected performance on the network (e.g., a maximum threshold and a minimum threshold). For example, prediction bands may be provided for different types of metrics (e.g., latency, availability, throughput, etc.) and for different parameters (e.g., time of day, region, traffic type, etc.). At 214, the method includes determining if any of the metrics are outside of an associated prediction band. If no metrics are outside of the respective prediction bands (e.g., "NO" at 214), the method proceeds to continue monitoring the network at 222.

If one or more metrics are outside of the respective prediction bands (e.g., "YES" at 214), the method includes outputting an alarm regarding a potential impairment event, as indicated at 215. For example, the alarm may be generated and output by an event detection service, such as event detection service 125 or event detection service 128 of FIG. 1. The method further includes performing triangulation to determine a cause and/or scope of the impairment, as indicated at 216. Examples of triangulation are described in more detail below with respect to FIGS. 3 and 4. At 218, the method includes outputting an indication of the determined cause/scope of impairment based on the triangulation performed at 216. For example, the indication may include a report and/or other machine- and/or human-readable output that enables further action to be performed responsive to the detection of the impairment. As a non-limiting example, the alarm output at 215 may include and/or cause a report to be displayed in a dashboard (e.g., presented via presentation service 116 and/or 132 of FIG. 1) that indicates the detection of the impairment event, and the report may be updated to indicate the cause based on the triangulation performed at 216. At 218, the method optionally includes performing a traffic adjustment based on the detected impairment. For example, as described above, a network traffic engineering service may reroute and/or otherwise adjust traffic on the network due to the detected impairment (e.g., routing traffic away from the impairment). As noted above, at 222, the method includes continuing to monitor conditions (e.g., returning to 202) in order to provide continuous real-time output relating to the performance of the network.

Figure 3:
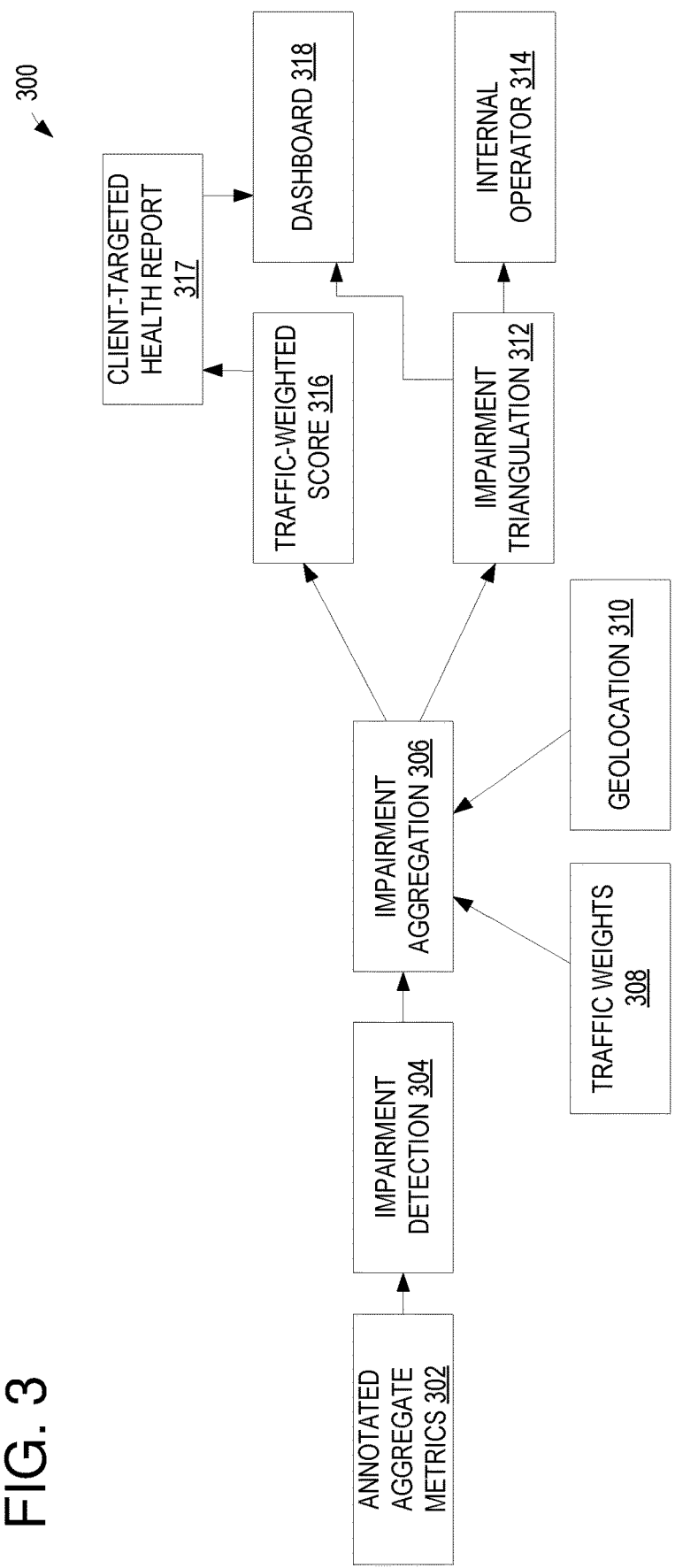
FIG. 3 is block diagram of an example process for performing triangulation of network health issues.

As described above, a triangulation process may be used to determine a cause of network issues in a network. The triangulation may be performed at a network level (e.g., to determine a general presence of an impairment and an identification of a network path that is estimated to have an impairment) and/or at a client/customer level (e.g., to determine if an application is causing an impairment to accessing the network). An example workflow or process flow 300 for detecting and triangulating impairments is shown in FIG. 3. As shown at 302, annotated aggregated metrics (e.g., the metrics in data store 112 of FIG. 1) are provided to an impairment detection service 304. The impairment detection service 304 analyzes the annotated aggregated metrics 302 (e.g., in accordance with any of the analysis mechanisms described herein) to determine anomalies indicating impairments on the network. The results of the impairment detection service 304 are provided to an impairment aggregation service 306 to aggregate the disparate indications of impairment on the network. As described above, the impairment aggregation service 306 may quantify overall impact of the detected impairments, based on traffic weights 308 associated with the impairments and geolocation 310 of the impairments. For example, the traffic weights 308 may be used to weight impairments based on an amount of traffic affected by the impairments.

Based on the aggregated impairment data generated at 306, an impairment triangulation service 312 may identify a cause of each aggregated impairment and/or each impairment associated with above a threshold amount of traffic. For example, the impairment triangulation service 312 may perform a triangulation algorithm, described in more detail below with respect to FIG. 4, to determine a most likely cause for the impairment (e.g., a network entity causing the impairment). The impairment triangulation notifies an internal operator 314 to inform the internal operator of the issue so that the internal operator is able to make informed changes to the network to address the issue based on the cause. Furthermore, the aggregated impairments may be provided to a traffic-weighted score generation service 316 to generate a score for each client and/or for the network as a whole, thereby indicating an impact of the aggregated impairment. In order to generate the score (e.g., an experience score for a client, described in more detail below), the system may compute the availability (and/or compute other performance metrics) for underlying components for an end-to-end path between the client and the Internet, using metrics from a plurality of sources. The availability may be computed for a selected granularity at which measurements are made from the network to an Internet endpoint of interest. In some examples, the granularity may be at a region to ASN level, meaning that the score is based on computations for the region to each ASN usable to connect the region to the Internet. The system may detect whether any of the metrics for this granular level of paths is anomalous (e.g., whether there is an anomaly detection on each of the underlying components), and traffic for each ASN is determined. The score may be computed as a ratio of good traffic to total traffic (e.g., the ratio of traffic flowing on non-anomalous paths to the total traffic flowing on all paths).

The traffic-weighted score and/or the results of the impairment triangulation (e.g., an indication of the cause of the impairment) may be provided to a client-targeted health report generation unit 317, which utilizes the score and/or other data to determine client-targeted Internet health data (e.g., indicating a percentage of traffic affected by a detected impairment and/or any of the network/Internet/client-related health data described herein). The health data may be provided to a dashboard 318 for output via a user interface. For example, the dashboard 318 may be an example of dashboard 118 and/or a dashboard that outputs information from presentation service 132 of FIG. 1.

Figure 4:
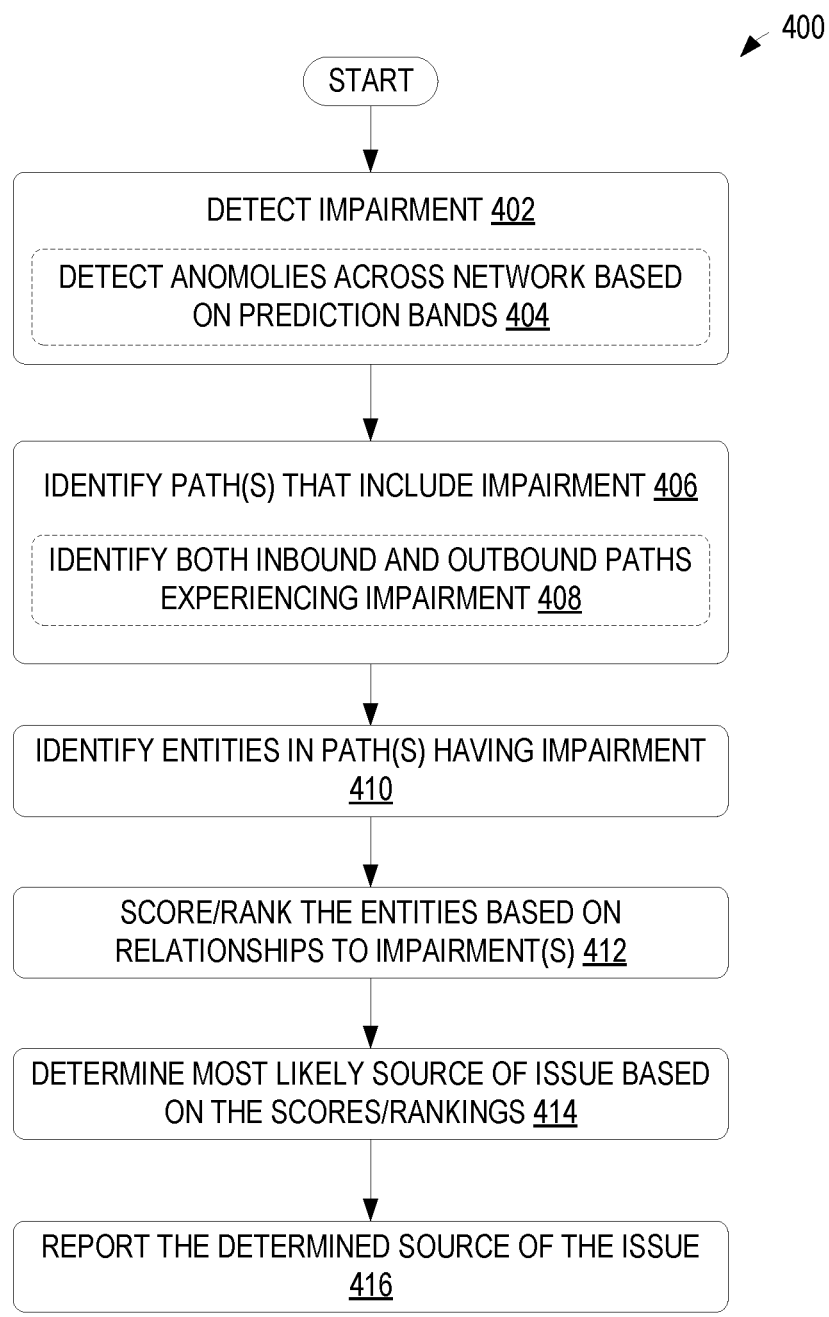
FIG. 4 is a flow chart of an example method for performing triangulation of network health issues.

FIG. 4 is a flow chart of an example method 400 for performing triangulation to determine a cause of network issues in a network. Method 400 may be performed by a triangulation engine, such as triangulation engine 122 of FIG. 1, to assist a monitoring platform and/or health monitoring service to pinpoint a root cause of an anomaly detected on the network. At 402, the method includes detecting an impairment. As indicated at 404, anomalies may be detected across the network based on prediction bands. For example, as described above, prediction bands may include predefined ranges of operational metrics that are expected to be measured on the network for a given location and state of the network (e.g., region, time of day, etc.). Metrics received from a plurality of sources (e.g., data sources 106 of FIG. 1) may be aggregated and processed to determine a deviation from the associated respective prediction bands.

At 406, the method includes identifying one or more paths that include the impairment. As indicated at 408, both inbound and outbound paths that experience the impairment may be detected. In this way, the system may narrow down a root of the impairment to components along the paths experiencing the impairment. For example, at 410, the method includes identifying entities (e.g., network devices, clients, links, intermediate networks, etc.) in the paths that are experiencing the impairment.

At 412, the method includes scoring and/or ranking the entities identified at 410 based on the relationships of the entities to the impairment, such as the number/percentage of paths through the entities that experience the impairment, etc. At 414, the method includes determining a most likely source of an issue relating to the impairment based on the scores/rankings. In some examples, the determined most likely source may be an entity with a highest ranking/score, such as an entity with the highest percentage or number of paths experiencing impairments. In some examples, other parameters may additionally be used to determine a most likely source of the impairment, such as an evaluation of past performance issues, a type of the impairment, etc. The determination at 414 may be associated with a confidence score based on the criteria used to make the determination and the number of entities in the paths experiencing the impairment. At 416, the method includes reporting the determined source of the issue. This reporting may include information relating to the determination (e.g., an identification of the paths experiencing the impairment, the entities in the paths, the type of impairment, the scores/rankings of the entities, etc.). In some examples, the determined source of the issue may be output to a dashboard for operator/user review. In additional or alternative examples, the determined source of the issue may be output to other services/engines to perform additional operations based on the determined source (e.g., to a traffic service to adjust traffic flow in the network based on the determined source, etc.).

Figure 5:
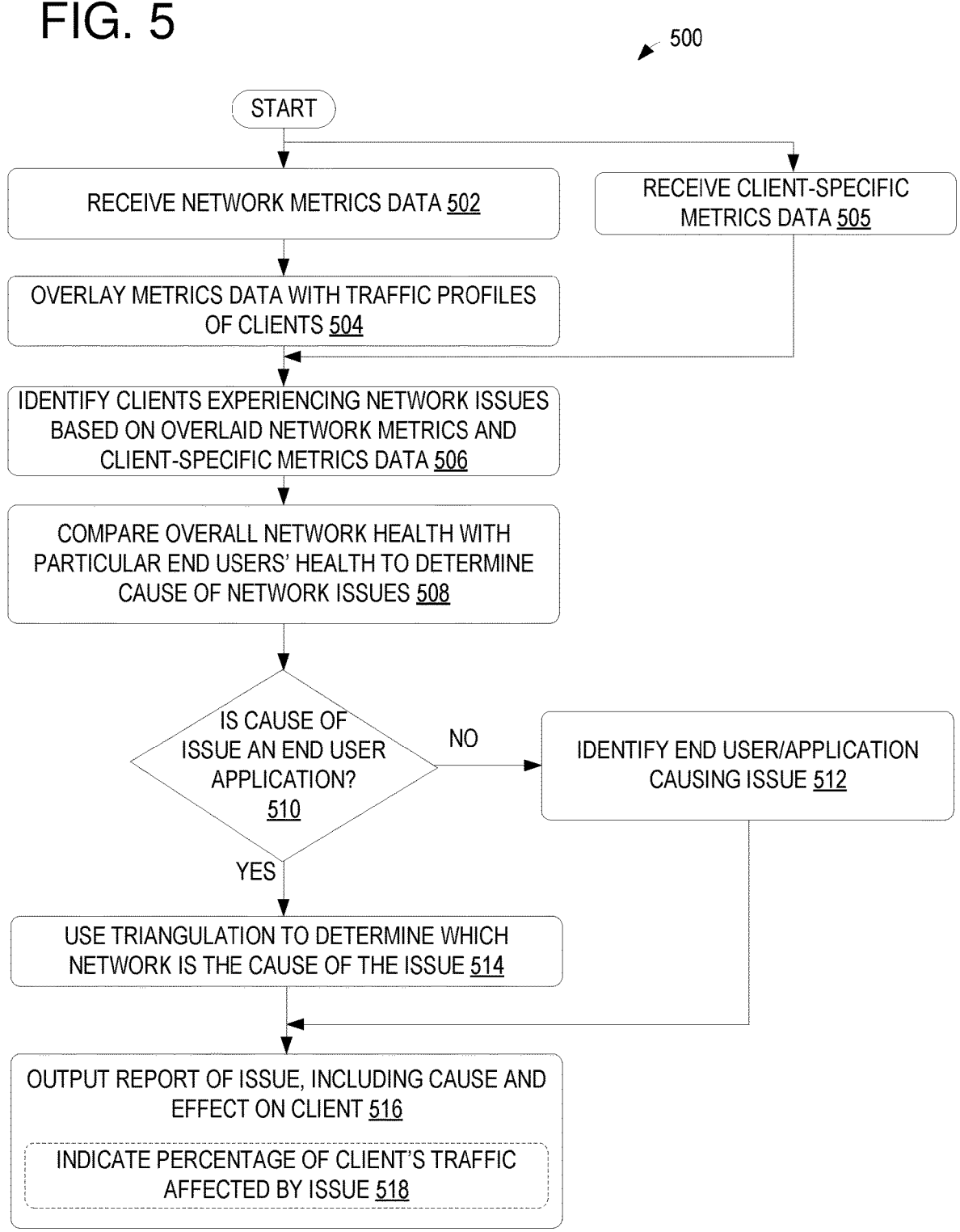
FIG. 5 is a flow chart of an example method for determining and reporting network issues with a client-targeted health monitoring service.

FIG. 5 is a flow chart of an example method 500 for performing a multi-level review of metrics data to determine a root cause of an issue/anomaly/impairment in a network. Method 500 may be performed by a health monitoring service, such as client-targeted health monitoring service 126 of FIG. 1. At 502, the method includes receiving network metrics data. As described above, the network metrics data may include aggregated metrics data from multiple sources that is annotated with parameter information relating to the data (e.g., location, topology information, etc.).

At 504, the method includes overlaying the metrics data with traffic profiles of clients. For example, the traffic profiles may indicate regions and distributions of traffic from the clients throughout the network. Overlaying the metrics data with the traffic profiles may include using the traffic profiles to determine what portion of service/network-wide metrics correspond to the regions and distributions in the profiles and to aggregate (e.g., which may include weighting metrics based on the percentage of traffic in the traffic profiles corresponding to the metrics) and process this portion of the metrics to determine client-specific health information. The above-described overlaying thereby enables the detection of trends that are relevant to the clients. For example, if a client traffic profile indicates that no traffic is being provided in a selected region, the metrics for the selected region may be effectively ignored or weighted low when evaluating network issues for the client. In additional or alternative examples, the client traffic profiles may be used to evaluate the metrics data. For example, if a client traffic profile indicates that a large amount of traffic is communicated in a selected region for a short period of time each day, then metrics relating to that short period of time may be evaluated against different expected performance bands than other times of day (e.g., as the metrics may be expected to have higher latency and/or higher throughput, etc. during the time when the traffic is increased). In this way, the overlaying of the metrics data with traffic profiles enables the system to determine availability and performance for the client based on service-wide metrics data and to determine how relevant a given detected impairment event is to the client (e.g., how much the impairment affects the traffic of the client).

As indicated at 505, the method may further include receiving client-specific metrics data. As described above with respect to metrics data 127 of FIG. 1, the client-specific metrics data may already be tied to a target client, and thus may be processed without overlaying the traffic profiles in some examples. At 506, the method includes identifying clients and/or end-users experiencing network issues based on the overlaid network metrics data and the client-specific metrics data. For example, clients and/or end-users experiencing network issues may be identified as those clients and/or end-users associated with traffic having corresponding metrics that fall outside of an associated predicted range or band of values.

At 508, the method includes comparing overall network health with particular end users' health to determine a cause of network issues (e.g., for a first level of evaluation). For example, the overlaid metrics data may be used to generate reports of health/traffic metrics for the network as a whole and reports of health/traffic metrics for the particular end users. At 510, the method includes determining if the cause of the issue is an end user application. For example, if anomalies are detected (e.g., according to any of the mechanisms described herein) in the metrics for the end user and not for the network as a whole, the cause of the network issues may be determined to be due to an end user application. In other examples, the anomalies may be detected based primarily on application-specific data for the client/end user (e.g., and not reflected in the other metrics data, such as the network-wide metrics data) and accordingly may be associated with a corresponding application or end user. In an alternative scenario where the anomalies are detected for both the end user and the network, the cause may be determined to be present in an intervening network and/or a network device. If the cause is determined to be an end user application (e.g., "YES" at 510), the method includes identifying the end user and/or application causing the issue, as indicated at 512. For example, a last-used application before a first detected anomaly may be determined to be the cause of the anomaly. If the cause is not determined to be an end user application (e.g., "NO" at 510), the method includes using triangulation to determine which network is the cause of the issue, as indicated at 514. For example, the method 400 of FIG. 4 and/or the process shown in FIG. 3 may be performed to use triangulation at 514.

Once the cause of the issue is determined (e.g., the end user/application at 512 or the network at 514), the method includes outputting a report of the issues, including a cause and an effect on the client (e.g., a percentage of the client's traffic that is affected, based on the traffic profiles and the determined cause of the issue). For example, as indicated at 518, the report may indicate a percentage of the client's traffic that is affected by the issue (e.g., that passes through or otherwise utilizes the entity determined to be the cause of the issue) and/or other health information corresponding to the health of the Internet from a network-/service-wide perspective and/or from a client-targeted perspective. In some examples, the report may include graphs, tables, and/or other visualizations of health data (e.g., availability, latency, throughput, connections, load times, Internet/network health, and/or other metrics/health data for the network/client/application over time) that are configured for presentation via a graphical user interface of a computing device (e.g., a computing device presenting a dashboard based on output from a presentation service, such as presentation service 116 and/or 132 of FIG. 1).

Figure 6:
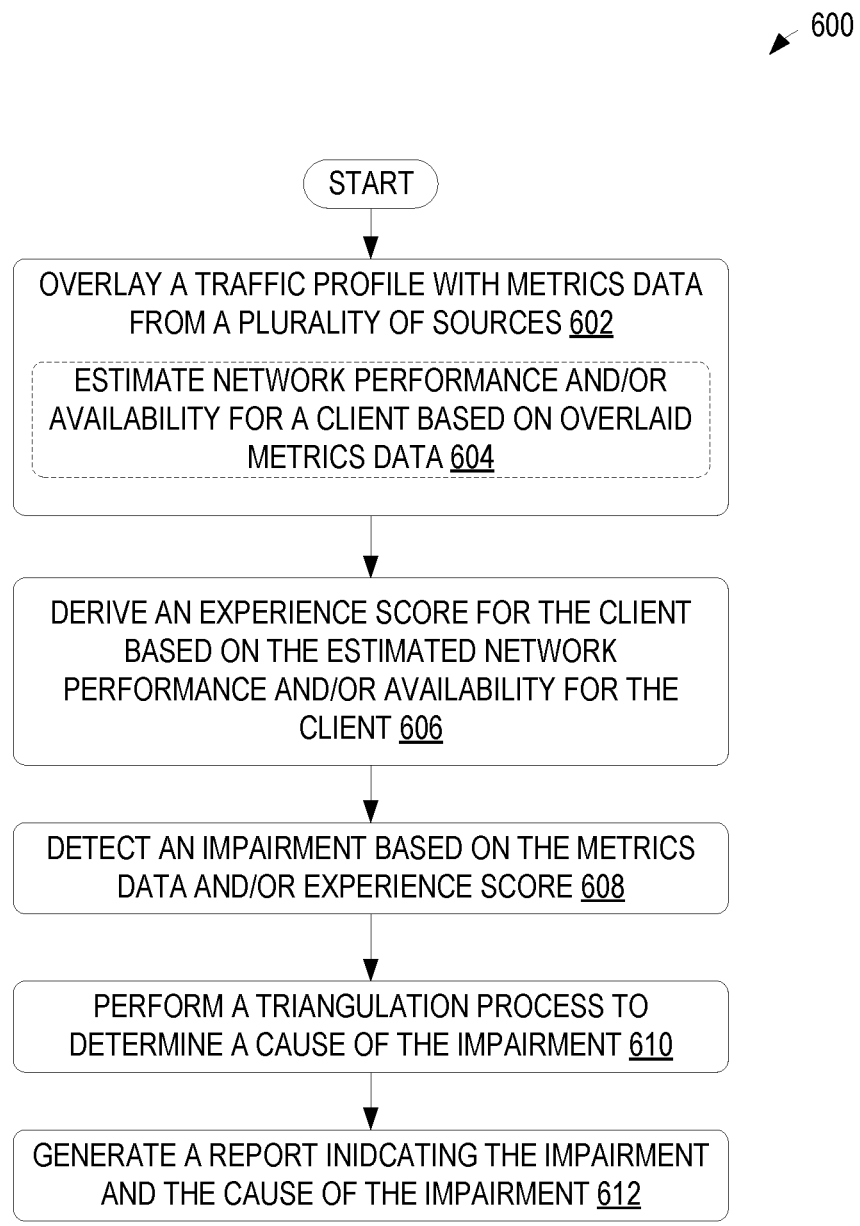
FIG. 6 is a flow chart of an example method for determining and reporting network issues using a monitoring platform and client-targeted health monitoring service.

FIG. 6 shows a flow chart of an example method 600 for detecting and reporting events in a network, such as events that affect a targeted client of the network. Method 600 may be performed by a client-targeted health monitoring service, such as service 126 of FIG. 1, in coordination with a monitoring platform, such as monitoring platform 102 of FIG. 1, in some examples. At 602, the method includes overlaying a traffic profile with metrics data from a plurality of sources. For example, the metrics data may include aggregated data from network services and/or client-specific data from client/end user applications. As indicated at 604, network performance and/or availability for a client may be estimated based on the overlaid metrics data. For example, the metrics that relate to the traffic indicated in the traffic profile may be aggregated to determine overall network performance and/or availability for the client, as described in more detail above with respect to FIGS. 2-4.

At 606, the method includes deriving an experience score for the client based on the estimated network performance and/or availability for the client. For example, as described in more detail above, the score may be computed as a ratio of good traffic to total traffic (e.g., the ratio of traffic flowing on non-anomalous paths to the total traffic flowing on all paths) based on the overlaid metrics data.

At 608, the method includes detecting an impairment based on the metrics data and/or experience score. For example, the metrics data may be compared to associated prediction bands to determine if the metrics fall outside the bands (e.g., indicating presence of an anomaly). At 610, the method includes performing a triangulation process to determine a cause of the impairment. Examples of a triangulation process are described above in more detail above, for example with respect to FIG. 4. At 612, the method includes generating a report indicating the impairment and the cause of the impairment. Examples of information and/or a form of the report are described in more detail above, for example with respect to FIG. 5.

Figure 7:
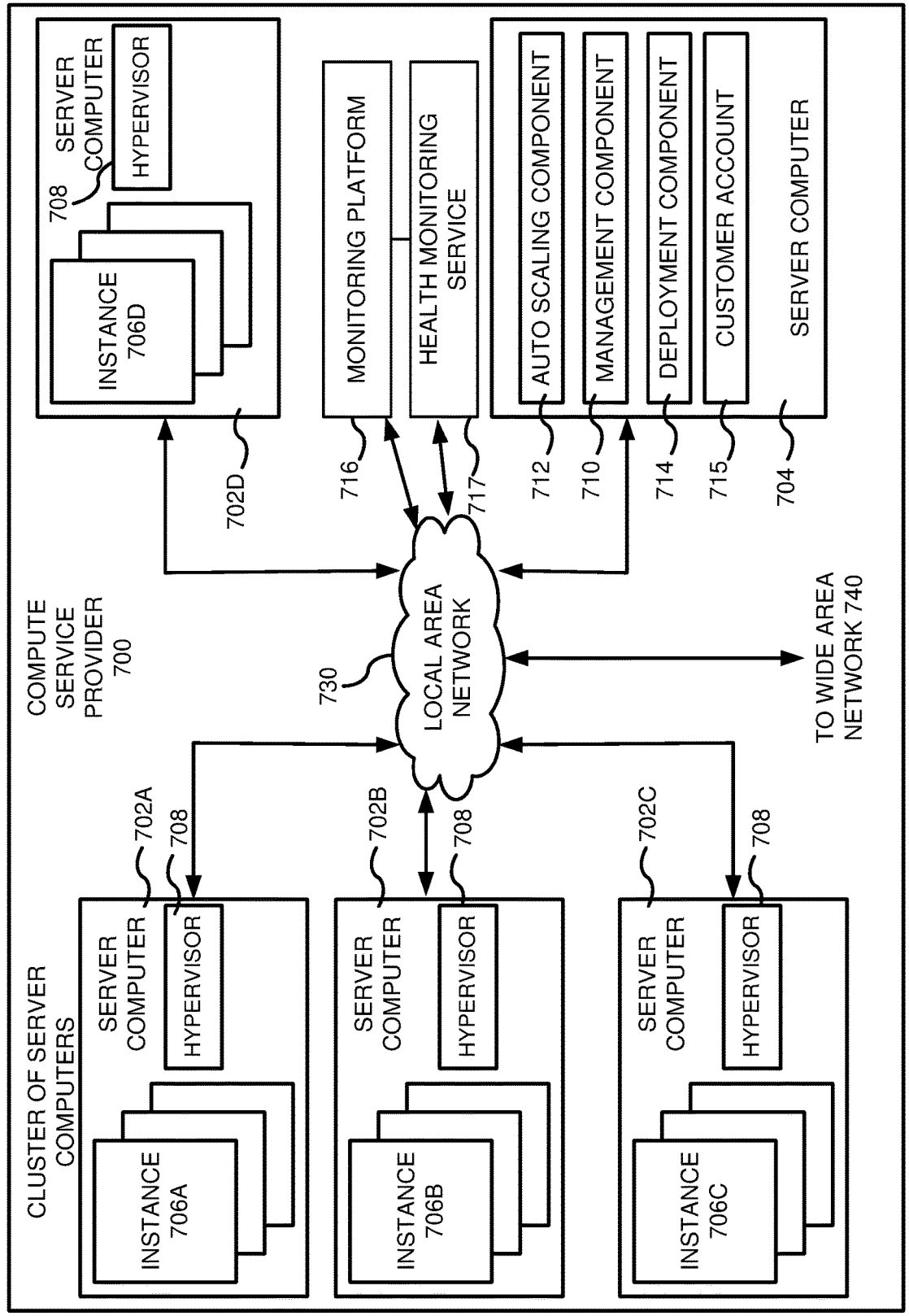
FIG. 7 is an example system diagram showing a plurality of virtual machine instances running in the multi-tenant environment.

FIG. 7 is a computing system diagram of a network-based compute service provider 700 that illustrates one environment in which embodiments described herein can be used. In some examples, one or more of the monitoring platform 102 and/or the client-targeted health monitoring service 126 of FIG. 1 is used and/or implemented in a cloud environment such as the environment of FIG. 7. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example of virtual machine, each of the servers 702A-702D can be configured to execute a hypervisor 708 or another type of program configured to enable the execution of multiple instances 706 on a single server. Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. In some examples, the server computer may include components for managing and/or interfacing with the network monitoring technologies described herein. In such examples, the components of the server computer may include tools (e.g., corresponding to tools that provide the measurements for the Internet metrics data sources 106 of FIG. 1) that access devices in the network (e.g., the other server computers 702A-702B and/or routers or other network devices in the local area network 730 and/or wide area network 740). For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A monitoring platform 716 may include components for implementing the network monitoring technologies described herein, such as the monitoring platform 102 of FIG. 1. For example, monitoring platform 716 may manage the performance of evaluating network health in the local area network 730, the server computers 702, the wide area network 740, and/or other networks in accordance with the methods and systems described herein. A health monitoring service 717, which may be an example of health monitoring service 126 of FIG. 1, may be built on top of the monitoring platform and may be configured to monitor and output network health information on a client-level for different clients of the compute service provider 700.

A network 730 can be utilized to interconnect the server computers 702A-702D and the server computer 704. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

Figure 8:
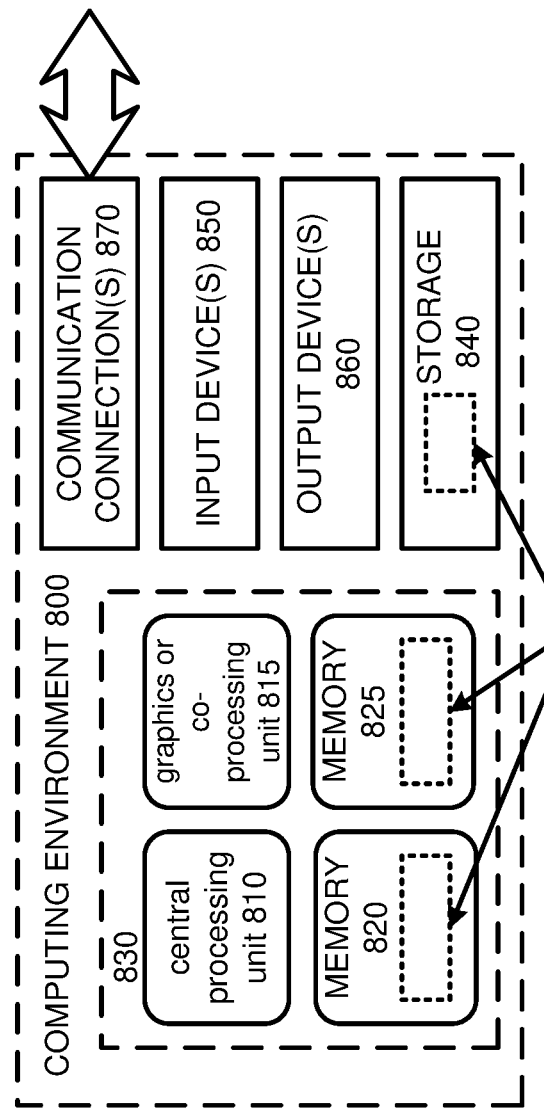
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods (e.g., methods 200, 400, and 500 of FIGS. 2, 4, and 5) can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
   memory for storing executable instructions; and
   one or more processors that execute the instructions to:
      receive, from a plurality of data sources, Internet metrics data;
      annotate the received metrics data with parameter information including respective location information associated with the metrics data;
      aggregate the annotated metrics data to generate representative measurements for a network corresponding to the metrics data;
      overlay the aggregated metrics data with traffic profiles for a client of the network;
      compare the representative measurements to respective prediction bands to detect an impairment in the network;
      perform a triangulation operation to identify a cause of the impairment;
      determine client-targeted health data for the client based on the overlaid metrics data and the detected impairment;
   perform a traffic adjustment in the network based on the cause of the impairment; and
      generate, for display in a dashboard presented via a user interface, an indication of the cause of the impairment and the client-targeted health data.

2. The system of claim 1, wherein the one or more processors further execute the instructions to generate, for display in the dashboard, the aggregated metrics data based on the overlaid traffic profiles.

3. The system of claim 1, wherein the Internet metrics data includes measurements from synthetic probes inserted into the network.

4. The system of claim 1, wherein the Internet metrics data includes measurements from traffic flowing in the network.

5. The system of claim 1, wherein the client-targeted health data includes estimates of availability, latency, or throughput based on a portion of the aggregated metrics relating to one or more end-to-end paths across which traffic associated with the client flows.

6. A method comprising:
   overlaying a traffic profile for a client of the network with metrics data from a plurality of data sources to estimate network performance and availability for the client;
   deriving an experience score for the client based on the estimated network performance and availability;
   detecting an impairment based on one or more of the metrics data or the experience score, wherein the impairment includes a network impairment in the network or an application impairment of an application of an end user of the client;
   performing a triangulation process to determine a cause of the network impairment or the application impairment based on the metrics data;
   performing a traffic adjustment in the network based on the cause of the network impairment or the application impairment; and
   generating, for display via a user interface, a report indicating the network impairment or the application impairment and the cause of the network impairment or the application impairment.

7. The method of claim 6, wherein performing the triangulation process comprises performing a first level of the triangulation process, which includes determining if the impairment is caused by the application of the end user or by a network entity based on application signals received from the end user.

8. The method of claim 7, further comprising, responsive to determining that the impairment is caused by the network entity, performing a second level of the triangulation process, which includes determining an identity of the network entity causing the impairment.

9. The method of claim 8, wherein determining the identity of the network entity comprises identifying each impaired communication path in the network on which the impairment is detected, identifying a set of network entities comprising each network entity along the impaired communication paths, and ranking each network entity in the set based at least on a number or percentage of paths through the respective network entity experiencing an impairment.

10. The method of claim 7, further comprising, responsive to determining that the impairment is caused by the network entity, performing a second level of the triangulation process that includes determining which of a plurality of intervening networks is causing the impairment.

11. The method of claim 6, further comprising weighting the impairment for the client based on the traffic profile of the client to generate the experience score, wherein a weight applied to the impairment increases with an increased amount of traffic affected by the impairment.

12. The method of claim 6, wherein the experience score is based on a location of the impairment relative to locations of traffic indicated in the traffic profile.

13. The method of claim 6, further comprising performing a time-window-based aggregation of the metrics data by combining all metrics data received within a time window.

14. The method of claim 13, wherein the metrics data is further combined based on a type of metric or a directionality of measurements associated with the metrics data.

15. The method of claim 14, wherein metrics for inbound and outbound data of a same type received during the time window are combined to produce an aggregated representative measurement for the type of metric data for that time window.

16. The method of claim 6, wherein the impairment is detected based on a determination that at least a portion of the metrics data indicates measurements that are outside of a respective measurement prediction band associated with the portion of the metrics data.

17. One or more computer-readable storage media comprising computer-executable instructions that, when executed, cause a computing system to perform a method comprising:
receiving metrics data from a plurality of data sources, the metrics data including measurements of network performance for a network;
detecting a plurality of impairments in the network based on comparisons of the metrics data to one or more prediction bands indicating expected network performance for the network;
aggregating the plurality of impairments based on traffic weights applied to each impairment of the plurality of impairments;
generating a traffic-weighted experience score for the client based on the aggregated plurality of impairments;
performing a triangulation process to determine a respective cause of the aggregated plurality of impairments in the network based on the metrics data;
performing a traffic adjustment in the network based on the cause of the aggregated plurality of impairments; and
generating, for display via a user interface, a report indicating the aggregated plurality of impairments and the cause of the aggregated plurality of impairments.

18. The one or more computer-readable storage media according to claim 17, wherein the report further indicates the traffic-weighted experience score.

19. The one or more computer-readable storage media according to claim 17, wherein the triangulation process includes determining an identity of a device or network causing the aggregated plurality of impairments by identifying each impaired communication path in the network on which the aggregated plurality of impairments is detected, identifying a set of network devices or networks comprising each network device or network along the impaired communication paths, and filtering out network devices or networks in the set that are also included in unimpaired communication paths.

20. The one or more computer-readable storage media according to claim 17, wherein the computer-executable instructions, when executed, further cause the computing system to output an indication of the aggregated plurality of impairments and the cause of the aggregated plurality of impairments to a traffic control service to adjust traffic flow in the network based on the aggregated plurality of impairments and the cause of the aggregated plurality of impairments.

* * * * *